(12) United States Patent
Faulkenberry et al.

(10) Patent No.: US 6,287,208 B1
(45) Date of Patent: Sep. 11, 2001

(54) VARIABLE LENGTH DRIVE SHAFT

(75) Inventors: Michael E. Faulkenberry; Todd A. Gillespie, both of Greenville, SC (US)

(73) Assignee: The Cline Company, Greenville, SC (US)

( * ) Notice: Subject to any disclaimer, the term of this patent is extended or adjusted under 35 U.S.C. 154(b) by 0 days.

(21) Appl. No.: 09/533,543

(22) Filed: Mar. 23, 2000

(51) Int. Cl.$^7$ ........................................................ F16D 3/06
(52) U.S. Cl. ............................................. 464/169; 464/180
(58) Field of Search .............................. 72/249; 464/162, 464/169, 180; 403/109.3, 359.1, 359.3, 359.4, 359.5, 377, 379.2, 379.3, FOR 100

(56) References Cited

U.S. PATENT DOCUMENTS

| | | | |
|---|---|---|---|
| 2,116,290 | * | 5/1938 | Spicer ................................... 464/162 |
| 3,171,269 | * | 3/1965 | Gilmore et al. ...................... 464/169 |
| 3,303,668 | | 2/1967 | Winkler . |
| 3,380,264 | | 4/1968 | Moore . |
| 4,003,219 | | 1/1977 | Stull . |
| 4,112,710 | * | 9/1978 | Okuda et al. ......................... 464/169 |
| 4,236,388 | | 12/1980 | Geisthoff . |
| 4,270,367 | * | 6/1981 | Santore ................................. 464/169 |
| 4,427,398 | | 1/1984 | Eisbrecher et al. . |
| 4,944,711 | | 7/1990 | Hironaka et al. . |
| 4,945,745 | | 8/1990 | Bathory et al. . |
| 5,080,634 | | 1/1992 | Makase . |
| 5,098,343 | * | 3/1992 | Tysver et al. .................. 403/359.3 X |
| 5,224,898 | * | 7/1993 | Johnson et al. .................. 464/169 X |
| 5,427,192 | * | 6/1995 | Stephenson et al. ............. 464/169 X |
| 5,716,276 | * | 2/1998 | Mangas et al. ................... 464/162 X |
| 6,033,310 | * | 3/2000 | Faulkenberry ..................... 72/249 X |

* cited by examiner

Primary Examiner—Lynne H. Browne
Assistant Examiner—Greg Binda
(74) Attorney, Agent, or Firm—Henry S. Jaudon

(57) ABSTRACT

A variable length drive shaft for a rolling mill roll including: a driven first end including a universal joint connecting with an end of a first splined shaft having an axial bore and counter bore and a driving second end including a universal joint connecting with a torque tube and a second spline shaft which engages with the first splined shaft for axial movement. A pilot rod is mounted in the counter bore adjacent to the end of the first splined shaft and extending along the length of drive shaft. A reaction tube is connected with the driving end and located within the torque tube. The reaction tube allows movement of the pilot rod within the drive shaft. Disk springs are mounted on the pilot rod and exert outward pressure against the driving and driven ends while allowing axial movement of the drive shaft.

17 Claims, 2 Drawing Sheets

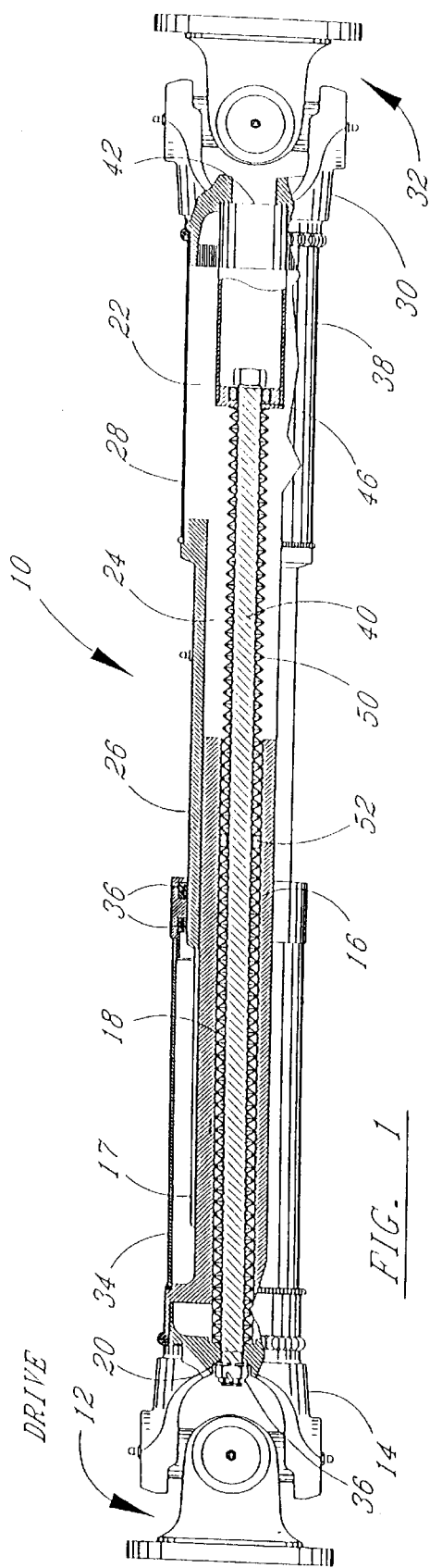
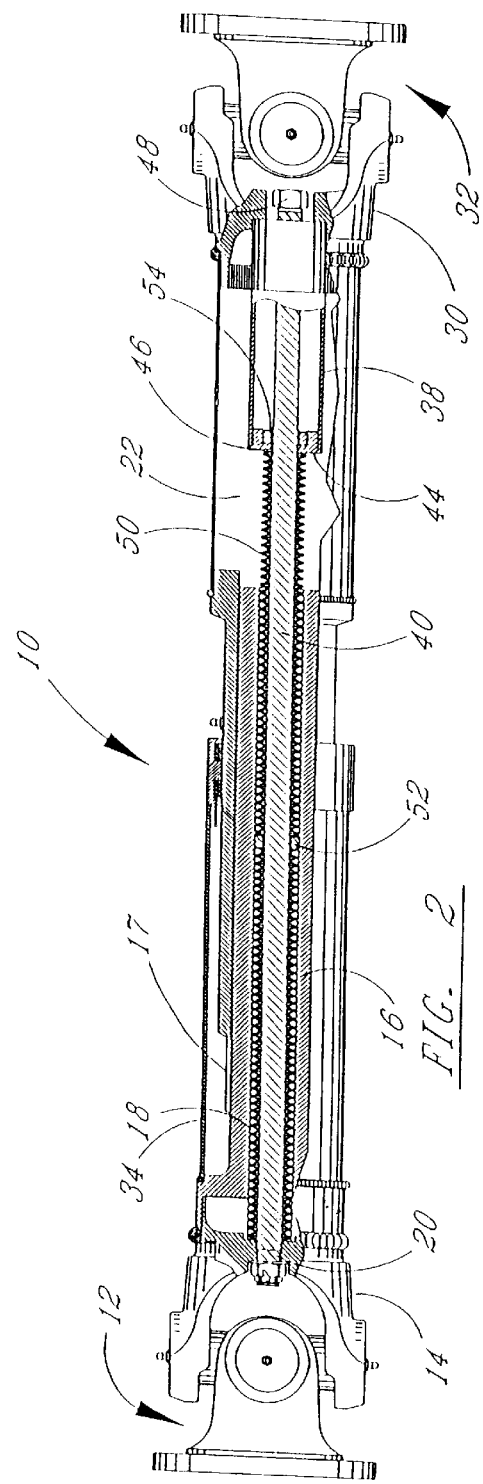

VARIABLE LENGTH DRIVE SHAFT

BACKGROUND OF THE INVENTION

The invention relates to an improved lightweight axially retractable drive shaft for driving the rolls of a rolling mill.

In the past axially retractable drive shafts for use with rolling mills utilized coil springs which applied a continuous outward axial thrust while providing the capability of inward compressive axial movement. In these drive shaft arrangements, the springs have a tendency to vibrate and generate excessive noise. The vibrations have a tendency to create unwanted stress and untimely breakdowns.

It is a primary object of the instant invention to overcome these drawbacks by providing a drive shaft which is lightweight and durable.

Another object of the invention is to provide an axially movable drive shaft which operates under continuous outward pressure.

Another object of the invention is an axially movable drive shaft which utilizes lightweight disk springs.

Another object of the invention is a lightweight drive shaft capable of delivering axially aligned outward pressure.

Another object of the invention in a drive shaft which resist the tendency to vibrate during use.

Another object of the invention is a drive shaft in which the tangent load capacity is easily adjustable.

Another object of the invention is a drive shaft capable of continuously transmitting torque, adjusting its axial length and adjusting its axial thrust and alignment.

SUMMARY OF THE INVENTION

The instant invention is directed to a variable length drive shaft for driving a rolling mill roll which weighs approximately 109 kg. The drive shaft is formed with a first end connected with a drive unit and a second end connected with a driven member. The drive shaft includes a pair of splined shafts interengaged for relative axial movement of at least 310 mm. The splined shafts are engaged in a fixed rotational relationship.

The drive shaft comprises a drive end connecting with a drive member which delivers rotational motion and a driven end connecting with and rotably driving a driving member. The drive end includes a first connecting member joined with an end of a first splined shaft having an axial bore coincided with the longitudinal axis of the drive shaft. The driven end includes a second connecting member joined with a second splined shaft. The first and second splined shafts interengage for axial movement while maintaining a fixed rotational relationship.

A reaction tube is fixedly mounted within the axial bore and is mounted for axial movement at its second end within the reaction tube. A rod is secured at a first end within the axial bore and is mounted for axial movement at its second end within the reaction tube. A resilient unit is provided within the drive shaft to exert outward pressure along the longitudinal axis of the drive shaft against the drive and driven ends.

A dust sleeve is connected with the driven end and encases a portion of the first and second spline shafts. The dust sleeve is fixed at one end adjacent the first connecting member. The first splined shaft includes a cone shaped bore extending through its end which receives the first end of the rod which is shaped to snugly fit therein. The inner end of the reaction tube includes an end plate provided with a bushing lined opening which is adapted to receive the second end of the rod. A shaped head retains the second end of the rod within the reaction tube.

The resilient unit comprises a plurality of spring disks carried by the rod which provides the outward resilient pressure against the driving and driven ends.

It is preferred that the first splined shaft be a male splined shaft and the second splined shaft be a female splined shaft.

A torque tube is connected with the second splined shaft and the connecting member. The torque tube includes a cavity in which the reaction tube is mounted.

The second connecting member includes an opening axially aligned with the second end of the rod. This opening allows the second end of the rod to move through the connecting member during maximum compression of the drive shaft.

The resilient members, which comprise spring disk, have a load to flatten capability of between 760 and 765 lbf.

A bushing, carried by the rod within the axial bore, acts to maintain the shaft aligned along the longitudinal axis of the drive shaft. The bushing also acts to separate the spring disk into groups. The rod may carry a plurality of bushings.

DESCRIPTION OF THE DRAWINGS

FIG. 1 is a cutaway side of the drive shaft of the invention in its extended position;

FIG. 2 is a cutaway side view of the drive shaft of the invention in its compressed position;

DESCRIPTION OF THE PREFERRED EMBODIMENT

Referring now in more detail to the drawings, the invention will now be described in more detail.

A drive shaft according to the invention is shown at 10 in FIGS. 1 and 2. Drive shaft 10, while being a very large piece of equipment, weighs only approximately 109 kg. It is designed primarily to connect with and drive the rolls of a rolling mill. As rolling mill rolls normally have some axial motion, it is necessary that drive shaft 10 also be capable of limited axial motion while delivering the driving motion. Also, the drive shaft is designed to eliminate internal vibrating motions which sometimes occur during operation.

The drive shaft of the invention is not limited to use with rolling mills and may be utilized with others suitable systems.

Figure 3:
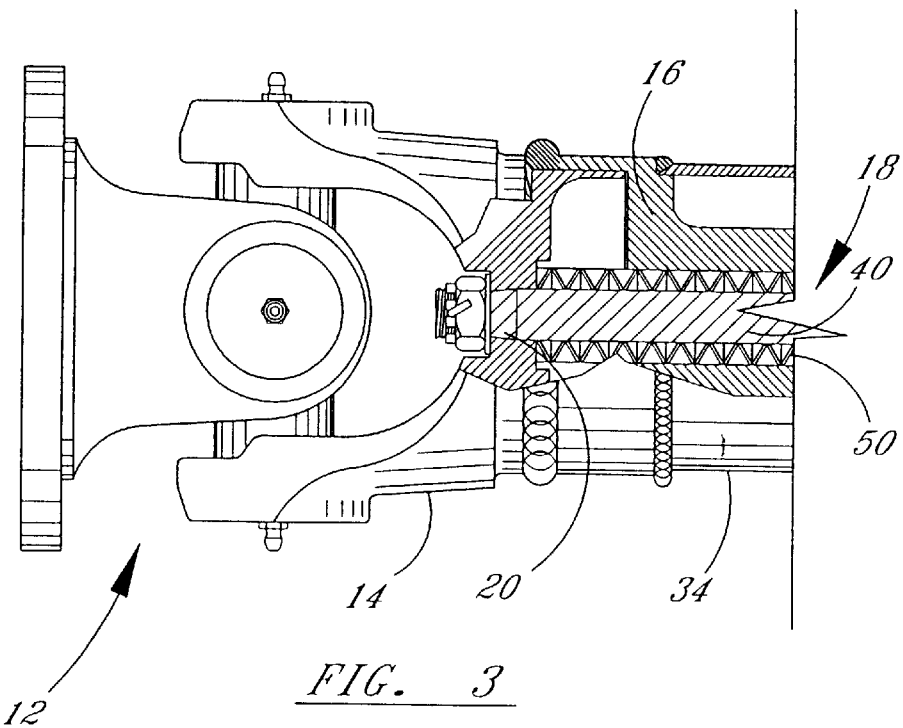
FIG. 3 is a exploded sectional view of the driving end of the novel drive shaft; and, FIG. 4 is a exploded sectional view of the driven end of the novel drive shaft.

Drive shaft 10 is formed with a universal coupling 12 (see also FIG. 3) at one end which engages with a drive system of any suitable type. Yoke 14, which forms a portion of universal coupling 12, is connected with external spline shaft 16 which happens to be a male splined shaft having splines 17 about its periphery. Splined shaft 16 is formed with an axial bore 18 which merges with a shaped end bore 20 in yoke 14.

An internal splined shaft 26, which happens to be a female splined shaft, is positioned over an end of spline shaft 16 with its splines (not shown) engaging with splines 17 in known manner. Spline shafts 16 and 26 are adapted for relative axial movement while being fixed against relative rotable movement. It is noted that which of shafts 16 and 26 carry the male or female spline is irrelevant.

Figure 4:
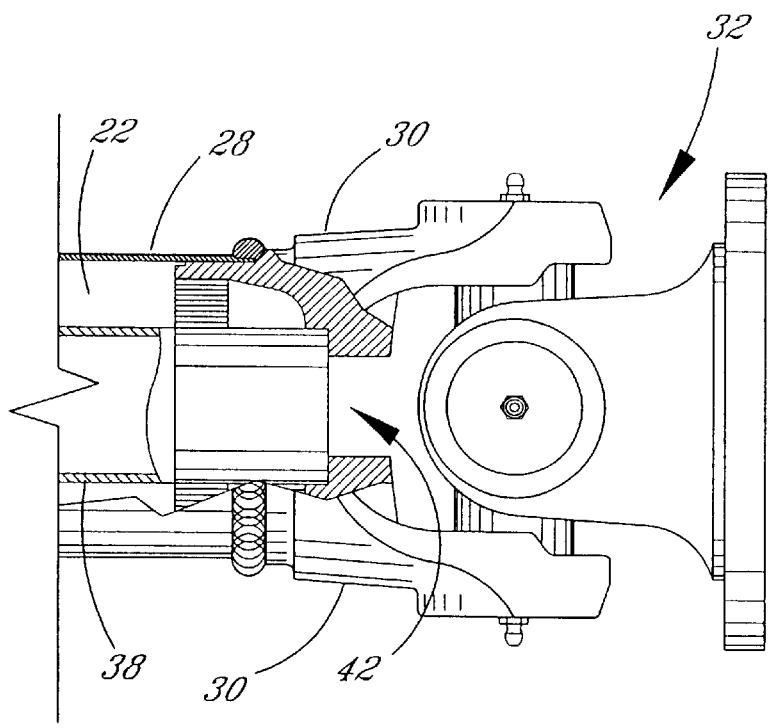

Mounted with an end of spline shaft 26 is torque tube 28 which extends to and is connected with yoke 30 of universal joint 32 at the driven end of the drive shaft 10 (see also FIG. 4). Torque tube 28 is a continuation of the hollow splined shaft 26 and forms an enlarged chamber 22 which receives reaction tube 38 which is fixed also with yoke 30.

Dust sleeve 34 is mounted at one end with spline shaft 16 adjacent yoke 14 and is arranged to extend over splines 17 of external spline shaft 16. The opposite end of dust sleeve 34 engages over the periphery of internal splined shaft 26 with a seal 36. Sleeve 34 acts to protect the splines of spline shaft 16 from dust and other contaminants while allowing relative axial movement between splined shafts 16 and 26.

Pilot rod 40, which is preferably an elongated bolt formed of case hardened steel, mates with and is engaged within a shaped bore 20 formed in yoke 14 and is axially aligned with the axis of bore 18 of spline shaft 16. Nut 36 fixedly secures pilot rod 40 in a fixed position which is also aligned with the axis of drive shaft 10.

Pilot rod 40 extends beyond the end of spline shaft 16 and into chambers 22, 24 formed by the combined splined shaft 26 and torque tube 28.

Yoke 30 is formed with axial bore 42 which is also aligned with the longitudinal axis of drive shaft 10. A reaction tube 38 is secured at its open end with yoke 30 within chamber 22 of torque tube 28 with its longitudinal axis aligned with the longitudinal axis of torque tube 28 and drive shaft 10. An end plate 44 is fixed with the opposite end of reaction tube 38. A bore 46 is formed in plate 44 with its longitudinal axis aligned with the longitudinal axis of torque tube 28 and reaction tube 38. End plate 44 through bore 46 limits axial movement of pilot rod 40 as shown in FIG. 1.

Pilot rod 40 is positioned with its end positioned through bore 46 and into the inner chamber of retention tube 38. End 48 which secures pilot rod in retention tube 38 is preferably machined to be four sided or hex shaped. Any known shape is acceptable.

A plurality of spring washers or disk 50 are mounted on and along the length of pilot rod 40 in side-to-side contact. Spring washers have a central bore which is substantially equal the circumference of pilot shaft 40 and a circumference substantially equal to that of bore 18. There is a slight clearance at each location to allow slight relative movement therebetween. A sufficient number of spring washers 50 are mounted on pilot shaft 40 so that a slight outward pressure is exerted against yoke 14 and plate 44 when drive shaft 10 is in its extended position as shown in FIG. 1 and a maximum of outward pressure is exerted by the spring washes when compressed as shown in FIG. 2.

Spring washers or disk 50 are commercially available and in themselves alone form no part of the instant invention. It is preferred that each washer has an outside diameter of between 1.56 and 1.58 dependent upon the size of bore 18 and a bore diameter of between 0.802 and 0.804 dependent upon the diameter of pilot rod 40. Finally, it is desired that the load to flatten pressure be between 760 and 765 (lbf). In total the spring washers exert a continuous outward pressure of between 1325 to 2370 Newtons against the driving and driven members. Due to their configuration and the closeness of the tolerances between the washers and the inner circumference of base 18 and the outer circumference of rod 40, vibration is held to a minimum during operation of drive shaft 10.

A bushing 52 is mounted within bore 18 preferably in the vicinity of its open end. Bushing 52 contains a plastic bearing (not shown) within its inner bore which engages with pilot rod 40. Bushing 52 acts to maintain the longitudinal axis of pilot rod 40 and that of drive shaft 10 aligned. Bushing 52 also helps to dampen vibration during operation of the drive shaft. Bore 46 of plate 44 also includes bushing 54 with a plastic bearing. Bushings 52, 54 allow axial movement of pilot shaft 40 while maintaining a sung fit about its periphery.

Drive shaft 10 may be made to be of varying lengths depending upon the requirements of its use. Preferably the drive shaft will be about 1755 mm to 1765 mm in length. Also, the length or distance it may be compressed also varies with its intended use. The active length and the compression capability may be adjusted by varying the strength of the spring washers, varying the shape of the spring washers, or by adding additional bushings. Again, it is believed that a compression capability of between 310 mm to 320 mm is most desirable.

In operations, drive shaft 10 is compressed by mechanical means into a position generally shown in FIG. 2 and positioned between and connected with a driving member via universal 12 and a driven roll of a rolling mill via universal 14. The mechanical compressing means are removed which allows spring disk 50 carried by pilot rod 40 to exert continuous outward axial pressure of between 1325 to 2370N against both the driving and driven members.

During operation, the distance between the driving and driven members has been found to vary slightly. The splined shafts 16 and 26 accommodate this action allowing axial movement of the drive shaft while pilot rod 40 and spring washers 50 act to maintain the necessary axial pressure against the driving and driven members with a minimum of vibration.

While a preferred embodiment of the invention has been described using specific terms, such description is for illustrative purposes only, and it is to be understood that changes and variations may be made without departing from the spirit or scope of the following claims.

What is claimed is:

1. A variable length drive shaft for driving a rolling mill roll including:
   a drive end connectable with a drive member which delivers rotational motion;
   a driven end connectable with said rolling mill;
   said drive end including a first connecting member joined with an end of a first splined shaft having an axial bore coincided with the longitudinal axis of said drive shaft;
   said driven end including a second connecting member joined with a second splined shaft, said first and second splined shafts interengaging for axial movement;
   a reaction tube fixedly mounted within a torque tube in axial alignment with said axial bore;
   a rod stationarily secured at a first end within said axial bore and mounted for longitudinal movement at a second end within said reaction tube;
   a resilient unit within said drive shaft acting to exert outward pressure along said longitudinal axis against said drive and driven ends; whereby,
   said drive and driven ends of said drive shaft are maintained in pressure contact with said drive member and said mill roll and said first and second spline shafts allow slight axial movements when said drive shaft is drivingly engaged with said drive member and said rolling unit.

2. The drive shaft of claim 1 including a dust sleeve encasing a portion of said first spline shaft and said second spline shaft.

3. The drive shaft of claim 2 wherein said dust sleeve is fixed at one end with said first spline shaft.

4. The drive shaft of claim 1 wherein said first splined shaft includes a cone shaped bore extending through said end, said first end of said rod being shaped to snugly fit into said cone shaped bore.

5. The drive shaft of claim 1 wherein an inner end of said reaction tube includes an end plate provided with a bushing lined opening, said opening being adapted to receive said second end of said rod.

6. The drive shaft of claim 1 wherein said resilient unit comprises a plurality of spring disks carried by said rod, said spring disks providing outward resilient pressure against said driving and driven ends.

7. The drive shaft of claim 1 wherein said first splined shaft is a male splined shaft.

8. The drive shaft of claim 1 wherein said second splined shaft is carried by said torque tube secured with said second connecting member, said reaction tube being mounted within said torque tube.

9. The drive shaft of claim 1 wherein said second connecting member includes an opening axially aligned with said rod, whereby said second end of said rod may be moved through said reaction tube and said second connecting member on maximum compression of said drive shaft.

10. A lightweight drive shaft for transmitting motion from a drive to a rolling mill roll including:

a first and a second end each connectable with one of said drive and said mill roll;

a pilot rod secured at one end in fixed position adjacent one of said first and second ends, said pilot rod extending along the longitudinal axis of said drive shaft to locate its other end adjacent the other of said first and second ends;

an external spline shaft having an axial bore secured with one of said first and second ends;

an internal spline shaft received about said external spline shaft with said internal and external splines engaged for longitudinal movement and in fixed rotational position, said internal spline shaft being fixed at one end with said other of said first and second ends;

a reaction tube having an axial opening secured with said other end of said first and second ends along said longitudinal axis of said drive shaft with a second end of said pilot rod located within said opening;

an end plate secured with said reaction tube, said end plate limiting axial movement of said other end of said pilot rod;

resilient members carried by said pilot rod urging said first and second ends outwardly away from each other; whereby, said drive shaft when engaged with said drive and said rolling mill exerts continuous outward pressure against said drive and said mill roll while allowing limited compressive movement.

11. The drive shaft of claim 10 wherein said resilient members comprise spring disks arranged along said pilot rod.

12. The drive shaft of claim 11 wherein said spring disks have a load to flatten capability of between 760 and 765 lbf.

13. The drive shaft of claim 10 wherein said axial bore of said external spline shaft receives said pilot rod.

14. The drive shaft of claim 13 including a bushing carried by said pilot rod within said axial bore, said bushing acting to dampen vibration and maintain said pilot shaft aligned along said longitudinal axis.

15. The drive shaft of claim 14 wherein said resilient members comprise spring disks carried by said pilot rod; and, said bushing acts to separate said spring disks into groups.

16. The drive shaft of claim 10 wherein said internal and external spline shafts allow an axial extension of said drive shaft up to approximately 310 mm.

17. The drive shaft of claim 10 wherein said drive shaft weighs approximately 109 kg.

* * * * *